(12) United States Patent
Lee et al.

(10) Patent No.: US 12,470,664 B2
(45) Date of Patent: Nov. 11, 2025

(54) DEVICE AND METHOD FOR PROVIDING VIRTUAL TRY-ON IMAGE AND SYSTEM INCLUDING THE SAME

(71) Applicant: NHN Corporation, Seongnam-si (KR)

(72) Inventors: Hyugjae Lee, Gyeonggi-do (KR);
Byumhyuk Koo, Gyeonggi-do (KR);
Rokkyu Lee, Gyeonggi-do (KR);
Gunhan Park, Gyeonggi-do (KR)

(73) Assignee: NHN Corporation, Gyeonggi-do (KR)

( * ) Notice: Subject to any disclaimer, the term of this patent is extended or adjusted under 35 U.S.C. 154(b) by 243 days.

(21) Appl. No.: 18/202,283

(22) Filed: May 26, 2023

(65) Prior Publication Data

US 2023/0388446 A1    Nov. 30, 2023

(30) Foreign Application Priority Data

May 26, 2022 (KR) .......................... 10-2022-0064688

(51) Int. Cl.
*H04N 5/272* (2006.01)
*G06Q 30/0601* (2023.01)
(Continued)

(52) U.S. Cl.
CPC ......... *H04N 5/272* (2013.01); *G06Q 30/0643* (2013.01); *G06T 19/006* (2013.01); *G06V 40/103* (2022.01); *H04N 2005/2726* (2013.01)

(58) Field of Classification Search
None
See application file for complete search history.

(56) References Cited

U.S. PATENT DOCUMENTS 10,885,708 B2 *  1/2021  Guay .......................... G06T 7/75
11,250,572 B2 *  2/2022  Sollami ..................... G06T 7/174
(Continued)

FOREIGN PATENT DOCUMENTS

JP      2013-190974        9/2013
JP      2018-73091         5/2018
(Continued)

OTHER PUBLICATIONS

Zanfir, Mihai, et al. "Human synthesis and scene compositing." Proceedings of the AAAI Conference on Artificial Intelligence. vol. 34. No. 07. 2020.*
(Continued)

*Primary Examiner* — Ryan M Gray
(74) *Attorney, Agent, or Firm* — WOMBLE BOND DICKINSON (US) LLP

(57) ABSTRACT

A computer device for providing a virtual try-on image includes a camera interface connected to a camera, a display interface connected to a display device, and a processor configured to communicate with the camera through the camera interface and communicate with the display device through the display interface. The processor is configured to receive input images generated by the camera photographing a user through the camera interface, by processing a user object obtained from one of the input images, generate pose estimation data representing a pose of the user object, select an input image having the user object of which pose represented by the pose estimation data matches a reference pose, generate the virtual try-on image by synthesizing a clothes object with the user object included in the selected input image, and visualize the virtual try-on image by controlling the display device through the display interface.

11 Claims, 13 Drawing Sheets

(51) Int. Cl.
  *G06T 19/00* (2011.01)
  *G06V 40/10* (2022.01)

(56) References Cited

U.S. PATENT DOCUMENTS

| | | | | |
|---|---|---|---|---|
| 11,328,523 | B2* | 5/2022 | Shechtman | G06V 20/20 |
| 11,361,495 | B1* | 6/2022 | Yan | G06T 7/579 |
| 11,769,227 | B2* | 9/2023 | Li | G06V 10/52 |
| 12,136,180 | B1* | 11/2024 | Karumuri | G06T 7/73 |
| 12,223,672 | B2* | 2/2025 | Assouline | G06T 13/40 |
| 2013/0246227 | A1 | 9/2013 | Du et al. | |
| 2022/0189087 | A1* | 6/2022 | Shuvi | G06T 11/60 |

FOREIGN PATENT DOCUMENTS

| | | |
|---|---|---|
| JP | 2020-170394 | 10/2020 |
| KR | 10-2020-0034028 | 3/2020 |
| KR | 10-2021-0056595 | 5/2021 |
| KR | 10-2350182 | 1/2022 |
| KR | 10-2527398 | 4/2023 |

OTHER PUBLICATIONS

Niu, Li, et al. "Making images real again: A comprehensive survey on deep image composition." arXiv preprint arXiv:2106.14490 (2021).*

Cui, Aiyu, Daniel McKee, and Svetlana Lazebnik. "Dressing in order: Recurrent person image generation for pose transfer, virtual try-on and outfit editing." Proceedings of the IEEE/CVF international conference on computer vision. 2021.*

Dong, Haoye, et al. "Towards multi-pose guided virtual try-on network." Proceedings of the IEEE/CVF international conference on computer vision. 2019.*

Office Action dated May 21, 2024 for Japanese Patent Application No. 2023-086482 and its English translation provided by Applicant's foreign counsel.

Yukiko KAWAGUCHI et al.: "Dress Capture for Video-Based Virtual Fitting", Department of Computer Science, The University of Electro-Communications, Tokyo, Japan, Feb. 9, 2023, pp. 1-8 (English Abstract).

Michael Snower et al.: "15 Keypoints Is All You Need", 2020 IEEE/CVF Conference on Computer Vision and Pattern Recognition (CVPR), Jun. 13, 2020, pp. 1-12.

Hyunsu Kim et al., "Exploiting Spatial Dimensions of Latent in GAN for Real-time Image Editing", arXiv:2104.14754v2 [sc.CV], Jun. 23, 2021.

Assaf Neuberger et al., "Image Based Virtual Try-on Network from Unpaired Data", 2020 IEEE/CVF Conference on Computer Vision and Pattern Recognition (CVPR), 2020. pp. 5184-5193.

Office Action dated May 19, 2025 for Korean Patent Application No. 10-2022-0064688 and its English translation from Global Dossier.

* cited by examiner

DEVICE AND METHOD FOR PROVIDING VIRTUAL TRY-ON IMAGE AND SYSTEM INCLUDING THE SAME

CROSS-REFERENCE TO RELATED APPLICATION

The present application claims priority under 35 U.S.C. § 119(a) to Korean patent application number 10-2022-0064688 filed on May 26, 2022, in the Korean Intellectual Property Office, the entire disclosure of which is incorporated by reference herein.

BACKGROUND

1. Technical Field

The present disclosure generally relates to a device, method and system for generating an image, and more particularly, to a device and method for providing a virtual try-on image and a system including the same.

2. Related Art

As use of user terminals such as smart phones, tablet PCs, PDAs (Personal Digital Assistants), and notebooks becomes popular and information processing technology develops, research on technologies for taking images and/or videos using the user terminals and editing the taken images and/or moving pictures is actively being conducted. Such image editing technology can also be usefully utilized in a virtual try-on service that provides a function of virtually trying on clothes handled by online shopping malls and the like. This virtual try-on service is a service that meets the needs of sellers and consumers, and is therefore expected to be actively used.

The above description is only intended to help understand the background of the technical ideas of the present disclosure, and therefore, it cannot be understood as the prior art known to those skilled in the art.

SUMMARY

Some embodiments of the present disclosure may provide a device and method for visualizing a virtual try-on image expressing a natural appearance of trying on clothes and a system including the same. For example, a device and method according to an embodiment of the present disclosure photographs a user playing screen sports, generates a virtual try-on image by synthesizing a clothes object with a photographed user object, and visualizes the generated virtual try-on image so that the user can see it.

In accordance with an aspect of the present disclosure, there is provided a computer device for providing a virtual try-on image, including: a camera interface connected to a camera; a display interface connected to a display device; and a processor configured to communicate with the camera through the camera interface and communicate with the display device through the display interface, wherein the processor is configured to receive input images generated by the camera photographing a user through the camera interface, generate pose estimation data representing a pose of a user object by processing the user object obtained from one of the input images, select the user object by determining whether the pose estimation data matches a reference pose, generate the virtual try-on image by synthesizing a clothes object with the user object, and visualize the virtual try-on image by controlling the display device through the display interface.

The pose estimation data may include first keypoints representing body parts of the user object.

The computer device may further include a storage medium configured to store second keypoints corresponding to the reference pose, and the processor may be configured to determine whether the pose estimation data matches the reference pose by determining whether the first keypoints match the second keypoints.

The processor may include a neural network trained to determine whether the keypoints of a first pose and the keypoints of a second pose match each other when keypoints of the first pose and keypoints of the second pose are received. The processor may be configured to receive data output from the neural network by inputting the first keypoints and the second keypoints to the neural network, and determine whether the first keypoints match the second keypoints based on the received data.

The processor may be configured to generate the virtual try-on image by performing image harmonization on the user object and the clothes object overlapping the user object.

The processor may be configured to generate a first synthesized image by synthesizing the clothes object with the user object, generate a second synthesized image by synthesizing a background image to be overlapped with the first synthesized image and the first synthesized image, and provide the second synthesized image as the virtual try-on image.

The processor may be configured to generate the first synthesized image by performing image harmonization on the user object and the clothes object overlapping the user object, and generate the second synthesized image by performing the image harmonization on the background image and the first synthesized image overlapping the background image.

The computer device may further include a communicator connected to a network, and the processor may be configured to receive the clothes object from a client server through the communicator.

In accordance with another aspect of the present disclosure, there is provided a virtual try-on image providing system. A virtual try-on image providing system according to an embodiment of the present disclosure includes: a camera installed to photograph a user; a display device configured to visualize an image; and a computer device configured to control the camera and the display device, wherein the computer device is configured to receive input images taken by the camera from the camera, generate pose estimation data representing a pose of a user object by processing the user object obtained from one of the input images, select the user object by determining whether the pose estimation data matches a reference pose, generate the virtual try-on image by synthesizing a clothes object with the user object, and visualize the virtual try-on image through the display device.

The computer device may be configured to generate a first synthesized image by synthesizing the clothes object with the user object, generate a second synthesized image by synthesizing a background image to be overlapped with the first synthesized image and the first synthesized image, and provide the second synthesized image as the virtual try-on image.

In accordance with another aspect of the present disclosure, there is provided a method for providing a virtual try-on image. The method includes: generating input images by photographing a user using a camera; generating pose estimation data representing a pose of a user object by processing the user object obtained from one of the input images; determining whether the pose estimation data matches a reference pose; generating the virtual try-on image by synthesizing a clothes object with the user object according to a result of the determination; and visualizing the virtual try-on image using a display device.

The generating the virtual try-on image may include generating a first synthesized image by synthesizing the clothes object with the user object; and generating a second synthesized image by synthesizing a background image to be overlapped with the first synthesized image and the first synthesized image, and wherein the second synthesized image may be provided as the virtual try-on image.

In accordance with another aspect of the present disclosure, there is provided a computer device for providing a user experience by visualizing background images. The computer device includes: a camera interface connected to a camera; a display interface connected to a display device; and a processor configured to communicate with the camera through the camera interface and communicate with the display device through the display interface, wherein the processor is configured to receive input images generated by the camera photographing a user through the camera interface, generate a first synthesized image by performing image harmonization on a user object included in a selected input image among the input images and a clothes object overlapping the user object, generate a second synthesized image by performing the image harmonization on one background image among the background images and the first synthesized image overlapping the background image, and display the second synthesized image by controlling the display device through the display interface.

The processor may be configured to convert the clothes object in association with the user object by processing the user object and the clothes object through a first convolutional neural network trained to perform the image harmonization, wherein the first convolutional neural network may include at least one first convolutional encoder layer and at least one first convolutional decoder layer, and wherein the first synthesized image may include at least a part of the user object and the converted clothes object overlapping the user object.

The processor may be configured to convert the first synthesized image in association with the background image by processing the background image and the first synthesized image through a second convolutional neural network trained to perform the image harmonization, wherein the second convolutional neural network may include at least one second convolutional encoder layer and at least one second convolutional decoder layer, and wherein the second synthesized image may include at least a part of the background image and the converted first synthesized image overlapping the background image.

The processor may be configured to, generate pose estimation data associated with an obtained user object by processing the user object obtained from one of the input images, and determine the one of the input images as the selected input image by determining whether the pose estimation data matches a reference pose.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, a preferred embodiment according to the present disclosure will be described in detail with reference to the accompanying drawings. It should be noted that in the following description, only parts necessary for understanding the operation according to the present disclosure are described, and descriptions of other parts will be omitted in order not to obscure the gist of the present disclosure. In addition, the present disclosure may be embodied in other forms without being limited to the embodiments described herein. However, the embodiments described herein are provided to explain in detail enough to easily implement the technical idea of the present disclosure to those skilled in the art to which the present disclosure belongs.

Throughout the specification, when a part is said to be "connected" to another part, this includes not only the case where it is "directly connected" but also the case where it is "indirectly connected" with another element interposed therebetween. The terms used herein are intended to describe specific embodiments and are not intended to limit the present disclosure. Throughout the specification, when a part is said to "include" a certain component, it means that it may further include other components rather than excluding other components unless specifically stated to the contrary. "At least one of X, Y, and Z", and "at least one selected from the group consisting of X, Y, and Z" may be interpreted as any combination of X one, Y one, Z one, or two or more of X, Y, and Z (e.g., XYZ, XYY, YZ, ZZ). Here, "and/or" includes all combinations of one or more of the corresponding configurations.

Figure 1:
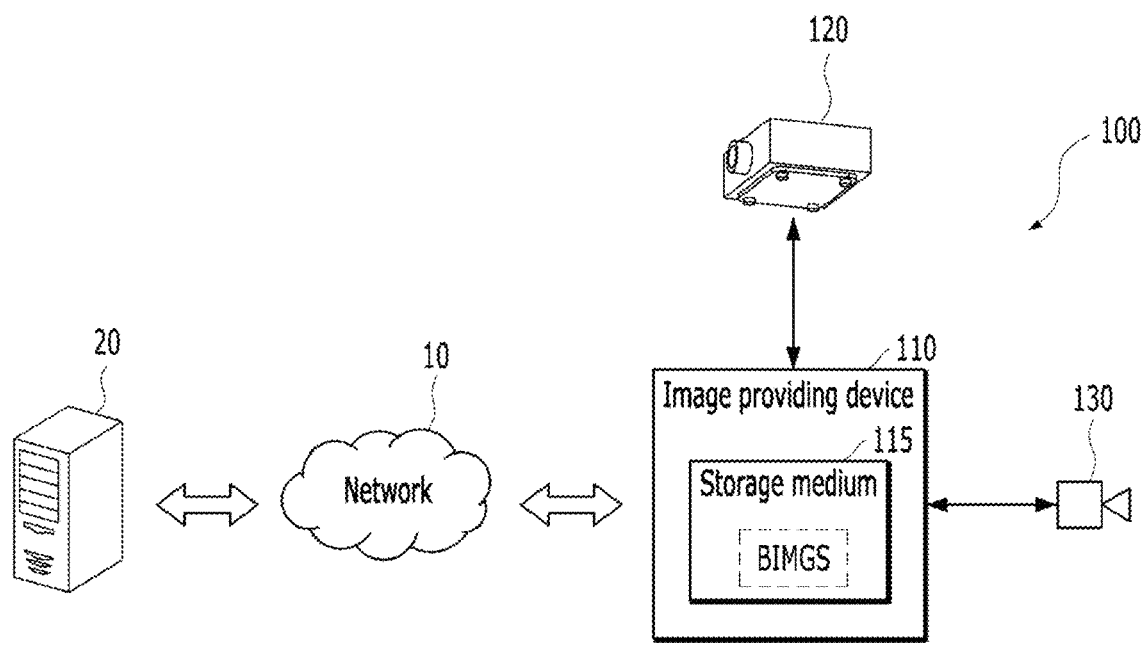
FIG. 1 is a block diagram for illustrating a system for providing a screen sports according to an embodiment of the present disclosure.

FIG. 1 is a block diagram for illustrating a system for providing screen sports according to an embodiment of the present disclosure.

Referring to FIG. 1, the system 100 providing screen sports may include an image providing device 110, a display device 120, and at least one capturing device 130 such as a camera. The image providing device 110 may include a storage medium 115 configured to store background images BIMGS and may be configured to provide a virtual environment for screen sports based on the background images BIMGS stored at the storage medium 115. For example, the image providing device 110 visualizes the background images BIMGS through the display device 120 to provide a virtual environment so that a user can experience the virtual environment. The background images BIMGS may include three-dimensional images as well as two-dimensional images.

In some embodiments of the present disclosure, the display device 120 may include, for example, but not limited to, a light emitting diode device, an organic light emitting diode device, a liquid crystal display device, a projector such as a beam projector and an image projector, and any type of devices that are capable of displaying images or videos. When a projector is used as the display device 120, the screen sports providing system 100 may further include a projection screen that provides a surface for visualizing the image projected by the projector.

The image providing device 110 may be connected to the camera 130. The image providing device 110 may receive one or more images of the user taken by the camera 130 and display the received images on the display device 120. Here, the image providing device 110 may display a video including a plurality of images as well as a image on the display device 120, and for convenience of description, it will be described below as displaying an "image" which may be interpreted as a single image, a plurality of images, and/or a video.

In certain embodiments of the present disclosure, the image providing device 110 may be connected to a server or manager server 20 through a network 10. The manager server 20 is configured to store the background images BIMGS in its database. The image providing device 110 may access the manager server 20 through the network 10 to retrieve or receive the background images BIMGS, and store the retrieved or received background images BIMGS in the storage medium 115. The image providing device 110 may periodically access the manager server 20 to update the database or the background images BIMGS stored in the storage medium 115.

Figure 2:
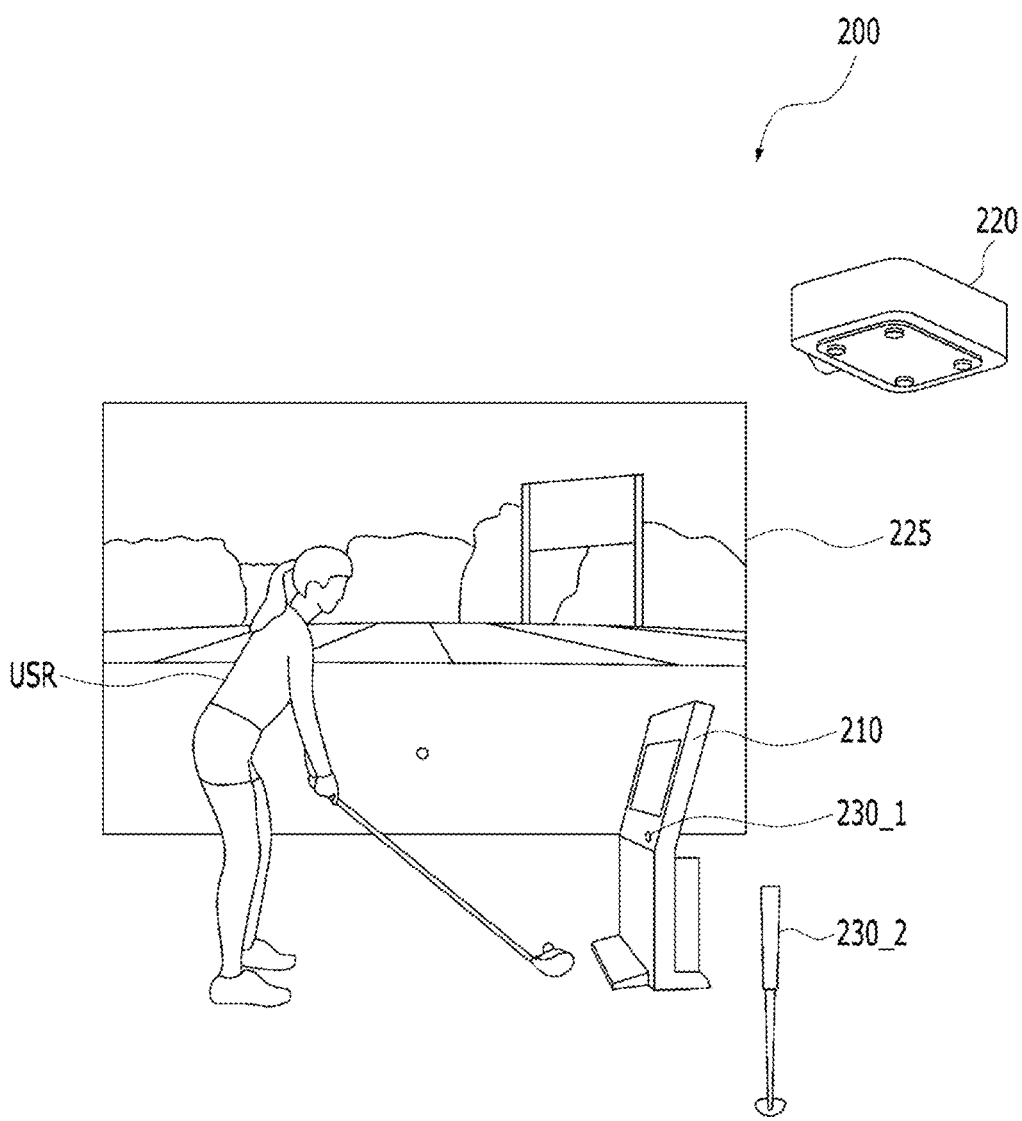
FIG. 2 is a diagram for illustrating an implementation example of a system for providing a screen sports.

FIG. 2 is a conceptual diagram for illustrating an implementation example of a system for providing the screen sports according to an embodiment of the present disclosure.

Referring to FIG. 2, a system 200 for providing screen sports may include an image providing device 210, a projector 220, a projection screen 225 associated with or corresponding to the projector 220, and one or more capturing devices such as cameras 230_1, 230_2. In some embodiments of the present disclosure, the image providing device 210 may communicate with the projector 220 and one or more cameras 230_1, 230_2 through wired and/or wireless networks.

As shown in FIG. 2, the image providing device 210 may display at least some of the background images BIMGS (see FIG. 1) on the projection screen 225 through the projector 220. The projector 220 is provided as the display device 120 of FIG. 1. For instance, the image providing device 210 may be implemented as a kiosk device including an additional display device.

One or more cameras 230_1, 230_2 face or aim at a space where a user USR will be located, and accordingly, the cameras 230_1, 230_2 may be configured to provide images of the user USR and/or the USR's movement to the image providing device 210. For example, the first camera 230_1 may be installed to capture or photograph the front of the user USR, and the second camera 230_2 may be installed to photograph the side of the user USR, although not required. The image providing device 210 may visualize the taken image(s) of the user USR and/or the background images BIMGS on the projection screen 225 through the projector 220.

In some embodiments of the present disclosure, the system 200 for providing the screen sports may further include a motion sensor configured to sense the movement of a ball (e.g., a golf ball) according to a play such as hitting, throwing, etc., or motion of the user USR. The image providing device 210 may receive information about the movement of the ball through the motion sensor, and visualize the movement of the ball together or along with the background images BIMGS on the projection screen 225 through the projector 220.

The image providing device 210 may extract an object of the user USR (hereinafter referred to as a "user object") from an image taken by one or more cameras 230_1, 230_2, generate a virtual try-on image by synthesizing the user object with clothes objects such as tops, bottoms, and hats, and visualize the generated virtual try-on image through the projector 220. The clothes object may be provided from an external or third party's server (e.g., a shopping mall server), and the external or third party's server may provide different clothes objects according to various factors such as the user's gender, user's age, month, and season.

As such, the image providing device 210 may provide one or more virtual try-on images using one or more devices already equipped in the system 200 for providing the screen sport (e.g., projector 220, projection screen 225, one or more cameras 230_1, 230_2, etc). In this case, the user USR can check whether the corresponding clothes suit him/her through a virtual try-on image while enjoying screen sports, and accordingly, the user USR's desire to purchase can be stimulated. Such an image providing device 210 will be described below in more detail with reference to FIG. 3.

Figure 3:
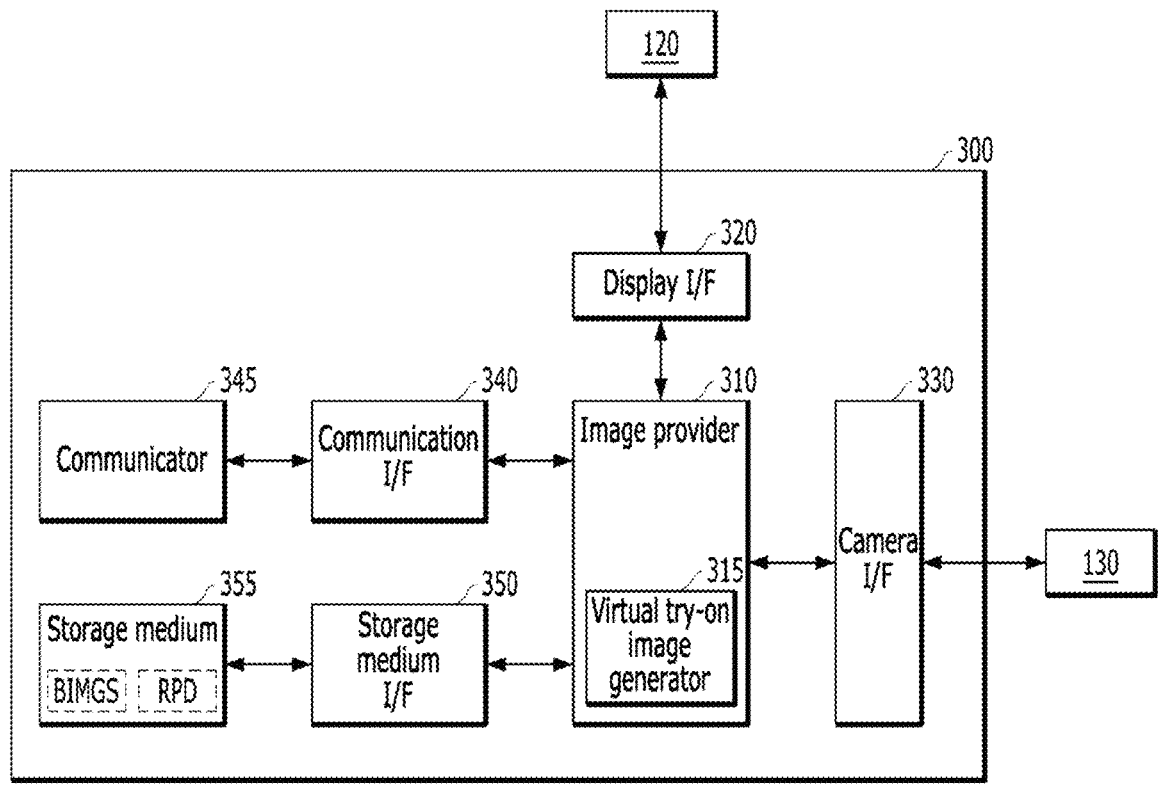
FIG. 3 is a block diagram for illustrating an image providing device of FIG. 1 according to an embodiment of the present disclosure.

FIG. 3 is a block diagram for illustrating an embodiment of an image providing device of FIG. 1.

Referring to FIG. 3, an image providing device 300 may include an image provider 310, a display interface (InterFace: I/F) 320, a camera interface 330, a communication interface 340, a communicator 345, a storage medium interface 350, and a storage medium 355.

The image provider 310 is configured to control various operations of the image providing device 300. The image provider 310 may communicate with the display device 120 of FIG. 1 through the display interface 320 and communicate with the camera 130 of FIG. 1 through the camera interface 330. The image provider 310 may display background images BIMGS stored in the storage medium 355 through the display device 120. In addition, the image provider 310 may receive an image of the user taken by the camera 130 and display the user object of the received image on the display device 120 together or along with at least some of the background images BIMGS.

The display interface 320 may be configured to interface between the display device 120 and the image provider 310. The display interface 320 controls the display device 120 according to data (e.g., images) from the image provider 310 so that the display device 120 can visualize the corresponding data.

The camera interface 330 may be configured to interface between the camera 130 and the image provider 310. The camera interface 330 may transmit control signals and/or data from the image provider 310 to the camera 130, and transmit data (e.g., images) from the camera 130 to the image provider 310.

The communication interface 340 may be configured to interface between the communicator 345 and the image provider 310. The communication interface 340 may access the manager server 20 on the network 10 (see FIG. 1) through the communicator 345 in response to the control of the image provider 310, and receive data (e.g., BIMGS) from the manager server 20 on the network 10 to transmit to the image provider 310. The communicator 345 is configured to connect to the network 10 and communicate with servers and/or devices over the network 10, such as an external manager server 20.

The storage medium interface 350 may be configured to interface between the storage medium 355 and the image provider 310. The storage medium interface 350 may write data (e.g., BIMGS) to the storage medium 355 in response to the control of the image provider 310, and read data stored in the storage medium 355 in response to the control of the image provider 310 and provide the data to the image provider 310. The storage medium 355 is configured to store data and may include at least one of non-volatile storage media.

According to an embodiment of the present disclosure, the image provider 310 may include a virtual try-on image generator 315 configured to generate a virtual try-on image by synthesizing a clothes object with a user object. The image provider 310 may display the generated virtual try-on image on the display device 120 to provide the user with a virtual try-on experience of clothes such as tops, bottoms, and hats.

Figure 4:
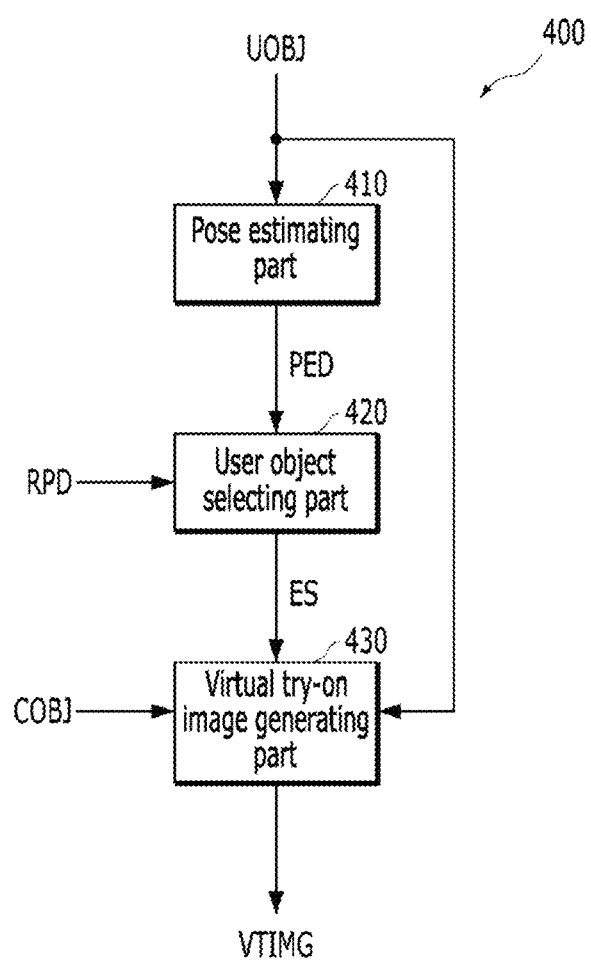
FIG. 4 is a block diagram for illustrating a virtual try-on image generator of FIG. 3 according to an embodiment of the present disclosure.
Figure 5:
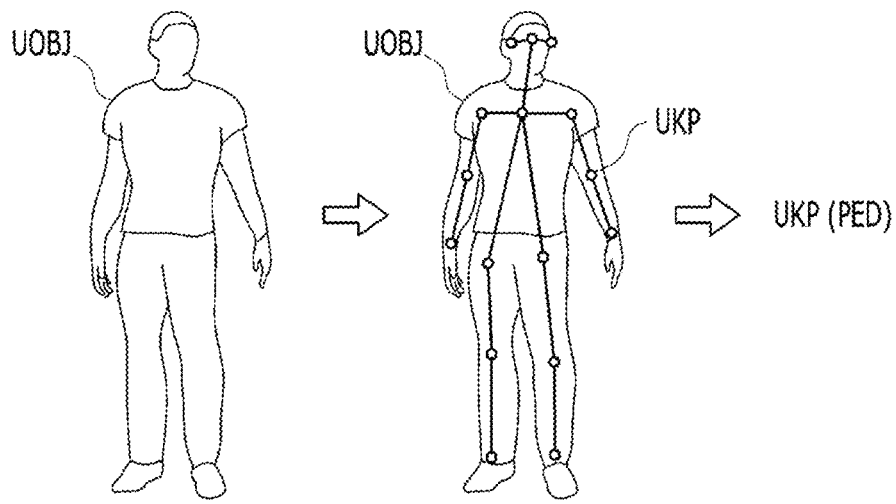
FIG. 5 is a diagram for conceptually illustrating pose estimation data generated from a user object according to an embodiment of the present disclosure.
Figure 6:
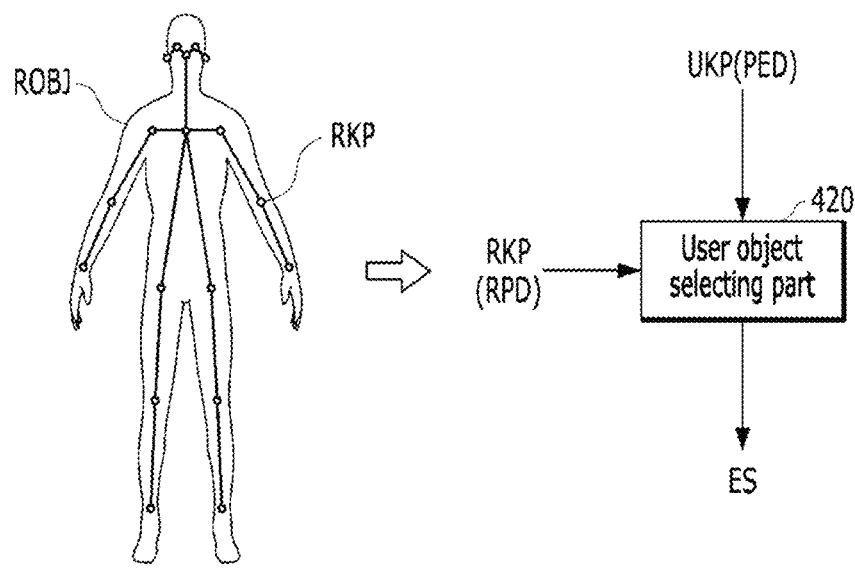
FIG. 6 is a block diagram for illustrating a user object selecting part of FIG. 4 according to an embodiment of the present disclosure.

FIG. 4 is a block diagram for illustrating a virtual try-on image generator of FIG. 3 according to an embodiment of the present disclosure. FIG. 5 is a conceptual diagram for conceptually illustrating pose estimation data generated from a user object. FIG. 6 is a block diagram for illustrating a user object selecting part of FIG. 4 according to an embodiment of the present disclosure.

Referring to FIGS. 3 and 4, a virtual wearing try-on generator 400 may include a pose estimating part 410, a user object selecting part 420, and a virtual try-on image generating part 430.

The pose estimating part 410 receives a user object UOBJ. The user object UOBJ is, for example, but not limited to, a user object UOBJ included in one of the input images generated by the camera 130 photographing the user. For convenience of description in FIG. 4, although the pose estimating part 410 is shown as an element of receiving the user object UOBJ, the pose estimating part 410 may be configured to receive one or more of input images generated by the camera 130 and extract a user object UOBJ from the received input image.

The pose estimating part 410 is configured to process the user object UOBJ, estimate a pose of the user object UOBJ, and generate pose estimation data PED.

The pose estimation data PED may include various types of data representing the pose of the user object UOBJ. In certain embodiments of the present disclosure, the pose estimation data PED may include coordinates and/or vectors of key (or major) points of the body of the user object UOBJ (hereinafter referred to as "user keypoints"). Referring to FIG. 5, the pose estimating part 410 may detect user keypoints UKP indicating a face area (e.g. eyes, nose, ears and neck area, etc.), shoulder area, elbow area, wrist area, hip area, knee area, and ankle area of the user object UOBJ, and output the detected user keypoints UKP as pose estimation data PED. The pose estimating part 410 may employ various algorithms known in the art for detecting the keypoints of the body.

In some embodiments of the present disclosure, the pose estimating part 410 may include a neural network (or artificial intelligence model) trained to detect the keypoints of a human object based on deep learning, and may estimate the user keypoints UKP from the user object UOBJ using the trained neural network.

Referring back to FIG. 4, the user object selecting part 420 may receive the pose estimation data PED from the pose estimating part 410. In addition, the user object selecting part 420 may read reference pose data RPD from the storage medium 355. The user object selecting part 420 may be configured to generate an enable signal ES by determining whether the pose estimation data PED matches the reference pose data RPD.

The reference pose data RPD includes a type of data that can be compared with the pose estimation data PED. Referring to FIG. 6, the reference pose data RPD may include coordinates and/or vectors of major keypoints of the body of the reference object ROBJ having the desired pose (hereinafter "reference keypoints"). The reference keypoints RKP may indicate a face area (e.g. eyes, nose, ears and neck area, etc.), shoulder area, elbow area, wrist area, hip area, knee area, and ankle area of the reference object ROBJ, and the reference keypoints RKP may be provided as reference pose data RPD.

In some embodiments of the present disclosure, the reference object ROBJ may be processed by the pose estimating part 410 to generate reference keypoints RKP, and the reference keypoints RKP may be stored in the storage medium 355 of FIG. 3. In other embodiments of the present disclosure, the reference keypoints RKP may be provided from the manager server 20 (see FIG. 1) or an external third party's server on the network (see FIG. 1) and stored in the storage medium 355.

In certain embodiments of the present disclosure, the reference pose data RPD or reference keypoints RKP may indicate a pose with little overlap between bodies, a pose that appears frequently in multiple advertisements and/or model photos of shopping malls, or a pose suitable for overlapping the shape of a clothes object COBJ (see FIG. 4).

The user object selecting part 420 may receive the user keypoints UKP as the pose estimation data PED and receive the reference keypoints RKP as the reference pose data RPD. The user object selecting part 420 generates an enable signal ES when the user keypoints UKP match the reference keypoints RKP. In some embodiments of the present disclosure, the enable signal ES may be generated when the average of the distances between each of the user keypoints UKP and each of the reference keypoints RKP is equal to or less than a threshold value.

Referring back to FIG. 4, the virtual try-on image generating part 430 may receive a user object UOBJ and a clothes object COBJ. The image provider 310 of FIG. 3 may receive the clothes object COBJ from an external or third party's server (e.g., shopping mall server) on the network through the communicator 345, and the third server may provide the clothes object COBJ according to various factors such as the user's gender, user's age, month, and season.

When the enable signal ES is generated, the virtual try-on image generating part 430 is configured to overlap and synthesize the clothes object COBJ with the user object UOBJ to generate the virtual try-on image VTIMG.

An area in which the clothes object COBJ overlaps with the user object UOBJ may be determined according to various methods known in the art. In certain embodiments of the present disclosure, the virtual try-on image generating part 430 may include a clothing guide map generator configured to classify the user object UOBJ into a plurality of areas corresponding to different label values. In this case, when the user object UOBJ and the clothes object COBJ are input, the clothing guide map generator may further output information indicating a try-on area (e.g., upper body) corresponding to the clothes object COBJ among a plurality of classified areas of the user object UOBJ, for example, a corresponding label. Accordingly, an area to be overlapped by the clothes object COBJ among the user objects UOBJ may be selected.

In some embodiments of the present disclosure, the virtual try-on image generating part 430 may be configured to analyze the geometric shape of the user object UOBJ to overlap the clothes object COBJ and to transform the shape of the clothes object COBJ according to the analyzed geometric shape. Thereafter, the virtual try-on image generating part 430 may overlap the user object UOBJ with the transformed clothes object COBJ. Transforming the geometric shape of the clothes object COBJ and synthesizing it into the user object UOBJ may be included in certain embodiments of the present disclosure.

In some embodiments of the present disclosure, the virtual try-on image generating part 430 may employ at least one of various synthesis algorithms known in the field of virtual try-on.

The image provider 310 may display the virtual try-on image VTIMG on the display device 120 (see FIG. 3) to provide the user with a user experience of virtual try-on the clothes object COBJ. Considering that, in the screen sports, users can take various poses according to their movements, a high-quality virtual try-on image VTIMG may be provided by determining whether the pose estimation data PED matches the reference pose data RPD, and synthesizing the clothes object COBJ with the corresponding user object UOBJ according to the determination result. For example, the virtual try-on image VTIMG may represent a natural try-on of clothes.

Figure 7:
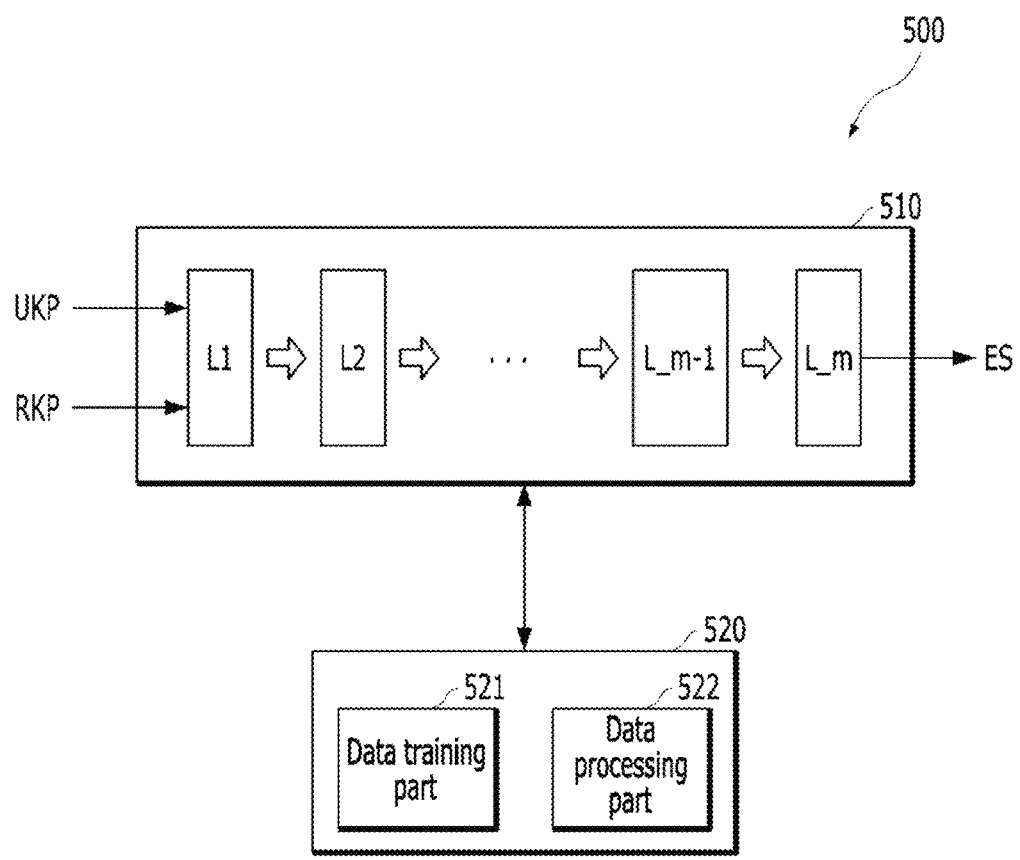
FIG. 7 is a block diagram for illustrating a user object selecting part of FIG. 4 according to another embodiment of the present disclosure.

FIG. 7 is a block diagram for illustrating an user object selecting part of FIG. 4 according to another embodiment of the present disclosure.

Referring to FIG. 7, a user object selecting part 500 may include a neural network (or artificial intelligence model) 510 and an artificial intelligence processor 520. The neural network 510 may include one or more neural network layers (L1, L2, . . . , L_m−1, L_m), and the neural network layers (L1, L2, . . . , L_m−1, L_m) may be pre-trained to provide an enable signal ES according to whether or not the neural network layers (L1, L2, . . . , L_m−1, L_m) match upon input of user keypoints UKP and reference keypoints RKP. For example, the neural network layers (L1, L2, . . . , L_m−1, L_m) may include encoding layers for extracting features from the user keypoints UKP and the reference keypoints RKP, and decoding layers for outputting the enable signal ES by determining whether the extracted features match each other.

The artificial intelligence processor 520 is configured to control the neural network 510. The artificial intelligence processor 520 may include a data training part 521 and a data processing part 522. The data training part 521 may use training data including keypoints of a first group (e.g. keypoints of a first pose), keypoints of a second group (e.g. keypoints of a second pose), and result values (i.e., enable signals) corresponding to them to train the neural network 510 to output an enable signal ES when the keypoints of the first group and the keypoints of the second group are input. Such training data may be obtained from any database server via the network 10 of FIG. 1. The data processing part 522 may input the user keypoints UKP and the reference keypoints RKP to the trained neural network 510 and obtain the enable signal ES as a result value when they match. The obtained enable signal ES is provided to the virtual try-on image generating part 430 of FIG. 4. As such, the user object selecting part 500 may determine whether the user keypoints UKP match the reference keypoints RKP using the trained neural network.

Figure 8:
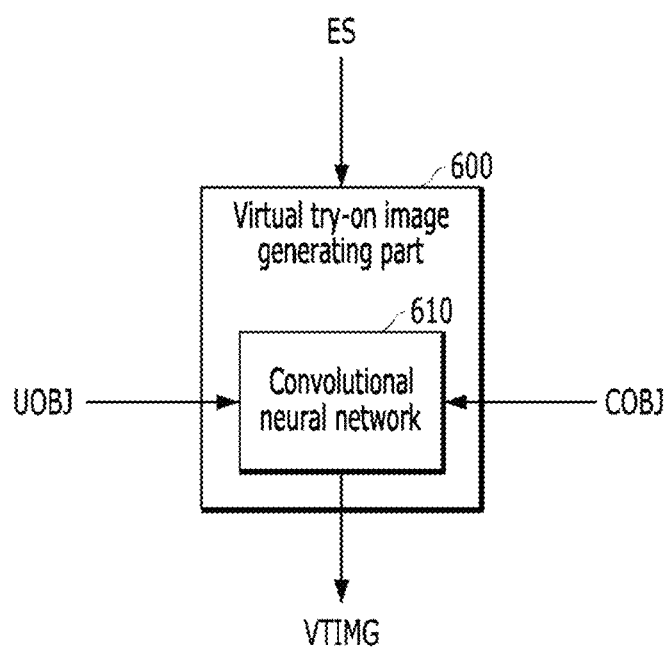
FIG. 8 is a block diagram for illustrating a virtual try-on image generating part of FIG. 4 according to an embodiment of the present disclosure.

FIG. 8 is a block diagram for illustrating a virtual try-on image generating part of FIG. 4 according to an embodiment of the present disclosure.

Referring to FIGS. 4 and 8, a virtual try-on image generating part 600 may include a convolutional neural network 610 trained to synthesize an object to be virtually tried-on on a human object according to image harmonization. When the enable signal ES is generated by the user object selecting part 420, the virtual try-on image generating part 600 overlaps the user object UOBJ with the clothes object COBJ, and may control the convolutional neural network 610 to generate the virtual try-on image VTIMG by synthesizing the user object UOBJ and the clothes object COBJ overlapping the user object UOBJ. The convolutional neural network 610 is configured to associate and convert the clothes object COBJ with the user object UOBJ, and the virtual try-on image VTIMG may include a user object UOBJ and a converted clothes object COBJ overlapping the user object UOBJ.

The features of the user object UOBJ may be changed according to environments such as lighting and brightness of a space in which the camera 130 of FIG. 3 is located or photographs the user, and may be different from the clothes object COBJ. In view of this, if a virtual try-on image is provided by simply overlapping the user object UOBJ with the clothes object COBJ, the clothes object COBJ may be different from the user object UOBJ in the corresponding virtual try-on image. The virtual try-on image generating part 600 may generate a virtual try-on image VTIMG including a converted clothes object COBJ that matches the features of the user object UOBJ, by synthesizing the user object UOBJ and the clothes object COBJ overlapping the user object UOBJ using the convolutional neural network 610.

Thereafter, the image provider 310 of FIG. 3 may display the virtual try-on image VTIMG through the display device 120. For example, the image provider 310 may visualize a screen on which the virtual try-on image VTIMG overlaps one of the background images BIMGS through the display device 120.

Figure 9:
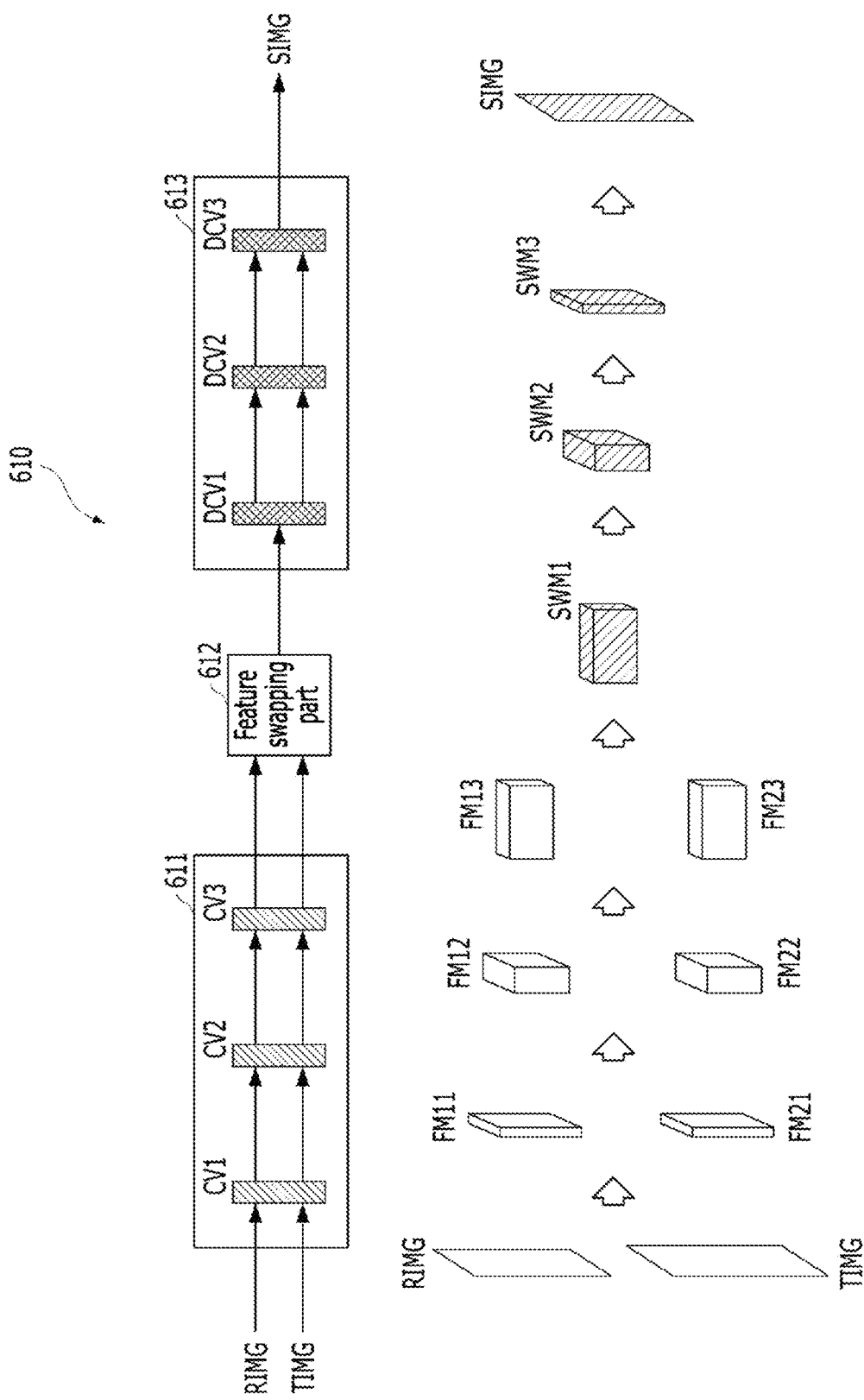
FIG. 9 is a block diagram for illustrating a convolutional neural network of FIG. 8 according to an embodiment of the present disclosure.

FIG. 9 is a block diagram for illustrating a convolutional neural network of FIG. 8 according to an embodiment of the present disclosure.

Referring to FIG. 9, the convolutional neural network 610 may include a convolutional encoder 611, a feature swapping part 612, and a convolutional decoder 613 configured to synthesize a reference image RIMG and a target image TIMG according to image harmonization.

The convolutional encoder 611 may include a plurality of convolutional encoder layers such as first to third convolutional encoder layers CV1 to CV3.

Each of the first to third convolutional encoder layers CV1 to CV3 may generate feature maps by performing convolution on input data and one or more filters, as is well known in the art. The number of filters for convolution can be understood as filter depth. When input data is convoluted with two or more filters, feature maps corresponding to a corresponding filter depth may be generated. At this time, the filters may be determined and modified according to deep learning. As shown in FIG. 9, each of a reference image RIMG and a target image TIMG overlapping the reference image RIMG may be provided as input data of the convolutional encoder 611. The reference image RIMG and the target image TIMG may be the user object UOBJ and the clothes object COBJ of FIG. 8, respectively.

As the reference image RIMG passes through the first to third convolutional encoder layers CV1 to CV3, feature maps FM11, feature maps FM12, and feature maps FM13 may be sequentially generated. For example, the reference image RIMG may be converted into the feature maps FM11 by passing through the first convolutional encoder layer CV1, the feature maps FM11 may be converted into the feature maps FM12 by passing through the second convolutional encoder layer CV2, and the feature maps FM12 may be converted into the feature maps FM13 by passing through the third convolutional encoder layer CV3. The filter depth corresponding to the feature maps FM11 may be deeper than the reference image RIMG, the filter depth corresponding to the feature maps FM12 may be deeper than the feature maps FM11, and the filter depth corresponding to the feature maps FM13 may be deeper than the feature maps FM12. These are illustrated in FIG. 9 as widths in the horizontal direction of the hexahedrons representing the feature maps FM11, the feature maps FM12, and the feature maps FM13.

Similarly, as the target image TIMG passes through the first to third convolutional encoder layers CV1 to CV3, feature maps FM21, feature maps FM22, and feature maps FM23 may be sequentially generated. The filter depth corresponding to the feature maps FM21 may be deeper than the target image TIMG, the filter depth corresponding to the feature maps FM22 may be deeper than the feature maps FM21, and the filter depth corresponding to the feature maps FM23 may be deeper than the feature maps FM22. These are illustrated in FIG. 9 as widths in the horizontal direction of the hexahedrons representing feature maps FM21, feature maps FM22, and feature maps FM23.

In certain embodiments of the present disclosure, the convolutional encoder 611 may further include subsampling layers corresponding to the first to third convolutional encoder layers CV1 to CV3, respectively. Each of the subsampling layers may reduce the complexity of the model by downsampling input feature maps to reduce the size of the feature maps. The subsampling may be performed according to various methods such as average pooling and max pooling. In this case, the convolutional encoder layer and the corresponding subsampling layer form one group, and each group may process input images and/or feature maps.

The feature swapping part 612 may receive the feature maps FM13 and the feature maps FM23 and swap at least some of elements of the feature maps FM23 with corresponding elements of the feature maps FM13. For example, the feature swapping part 612 may determine an element of the feature maps FM13 having the most similar value to each element of the feature maps FM23, and determine the determined element of the feature maps FM13 as a value of a corresponding element of the first swap maps SWM1. As such, elements of the feature maps FM13 may be reflected to elements of the feature maps FM23 to determine the first swap maps SWM1.

The convolutional decoder 613 may include a plurality of convolutional decoder layers, such as first to third convolutional decoder layers DCV1 to DCV3. The number of convolutional decoder layers DCV1 to DCV3 included in the convolutional decoder 613 may vary depending on application and configuration of the system.

Each of the first to third convolutional decoder layers DCV1 to DCV3 may perform deconvolution on the input data. One or more filters may be used for deconvolution, and the corresponding filters may be associated with filters used in the first to third convolutional encoder layers CV1 to CV3. For example, the corresponding filters may be transposed filters used in the convolutional encoder layers CV1 to CV3.

In some embodiments of the present disclosure, the convolutional decoder 613 may include up-sampling layers corresponding to the first to third convolutional decoder layers DCV1 to DCV3. The up-sampling layer may increase the size of the corresponding swap maps by performing up-sampling as opposed to down-sampling on input swap maps. The up-sampling layer and the convolutional decoder layer form one group, and each group can process input swap maps. In certain embodiments of the present disclosure, the up-sampling layers may include un-pooling layers and may have un-pooling indices corresponding to subsampling layers.

The first swap maps SWM1 may be sequentially generated as second swap maps SWM2, third swap maps SWM3, and a converted image SIMG by passing through the first to third convolutional decoder layers DCV1 to DCV3. For example, the first swap maps SWM1 may be converted into the second swap maps SWM2 by passing through the first convolutional decoder layer DCV1, the second swap maps SWM2 may be converted into the third swap maps SWM3 by passing through the second convolutional decoder layer DCV2, and the third swap maps SWM3 may be converted into the converted images SIMG by passing through the third convolutional decoder layer DCV3. The filter depth corresponding to the second swap maps SWM2 may be shallower than the first swap maps SWM1, the filter depth corresponding to the third swap maps SWM3 may be shallower than the second swap maps SWM2, and the filter depth corresponding to the converted image SIMG may be shallower than the third swap maps SWM3. These are illustrated in FIG. 9 as widths in the horizontal direction of hexahedrons representing the first swap maps SWM1, the second swap maps SWM2, the third swap maps SWM3, and the converted image SIMG. In certain embodiments of the present disclosure, the converted image SIMG may be the virtual try-on image VTIMG of FIG. 8. In some embodiments of the present disclosure, the converted image SIMG may be a clothes object COBJ converted to suit the features of the user object UOBJ. In this embodiment, the converted clothes object COBJ may be overlapped with the user object UOBJ to provide the virtual try-on image VTIMG.

As such, the convolutional neural network 610 may generate the converted image SIMG by reflecting features of the reference image RIMG, such as tone, style, saturation, contrast, and the like, on the target image TIMG. In addition, a convolutional neural network having various schemes, structures, and/or algorithms known in the art may be employed in the convolutional neural network 610 of FIG. 8.

Figure 10:
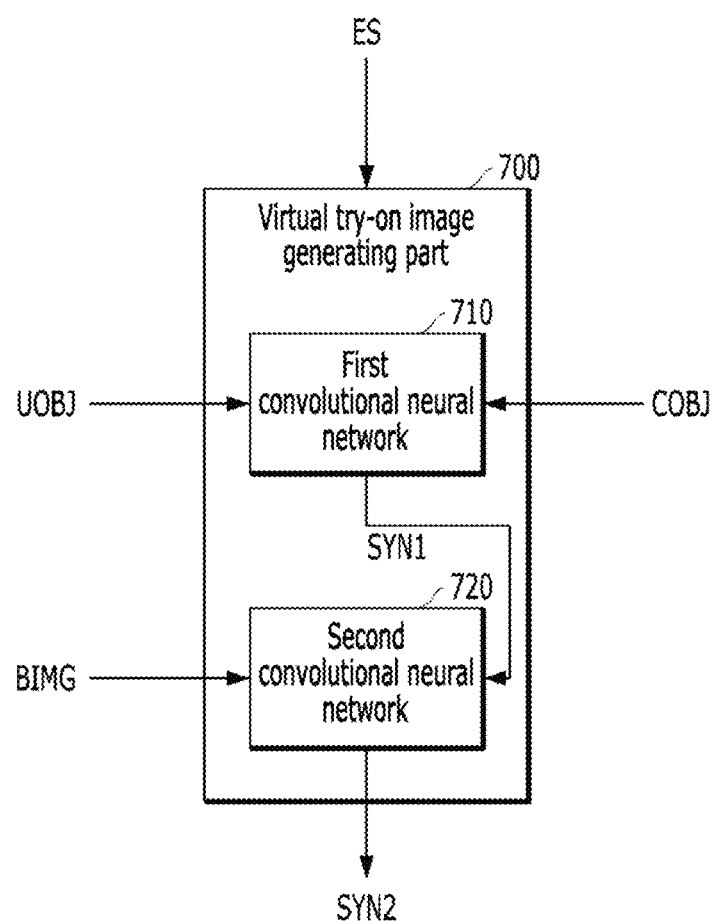
FIG. 10 is a block diagram for illustrating a virtual try-on image generating part of FIG. 4 according to another embodiment of the present disclosure.
Figure 11:
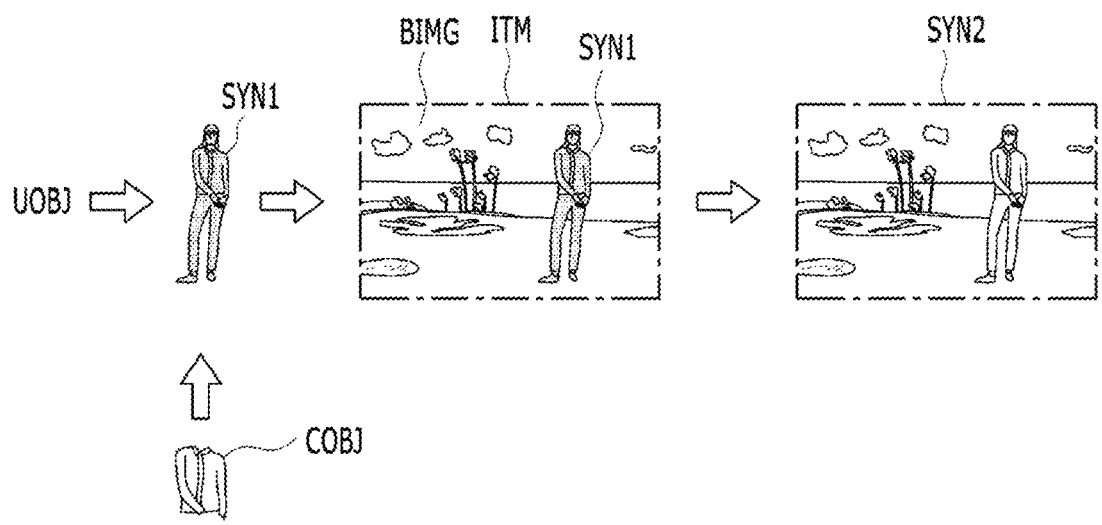
FIG. 11 is a diagram for exemplarily illustrating first and second synthesized images generated by a virtual try-on image generating part of FIG. 10 according to another embodiment of the present disclosure.

FIG. 10 is a block diagram for illustrating the virtual try-on image generating part of FIG. 4 according to another embodiment of the present disclosure. FIG. 11 is a diagram for exemplarily illustrating first and second synthesized images generated by the virtual try-on image generating part of FIG. 10.

Referring to FIGS. 10 and 11, a virtual try-on image generating part 700 may include a first convolutional neural network 710 and a second convolutional neural network 720.

The first convolutional neural network 710 may be configured similarly to the convolutional neural network 610 described above with reference to FIGS. 8 and 9. The first convolutional neural network 710 is configured to receive a user object UOBJ and a clothes object COBJ overlapping the user object UOBJ, and synthesize the user object UOBJ and the clothes object COBJ according to image harmonization and output a first synthesized image SYN1. Accordingly, the original clothes object COBJ is converted to reflect the features of the user object UOBJ, such as tone, style, saturation, and contrast, and overlaps the user object UOBJ in the first synthesized image SYN1.

The second convolutional neural network 720 receives one background image BIMG of the background images BIMGS (see FIG. 3) and a first synthesized image SYN1 overlapping the corresponding background image BIMG. In certain embodiments of the present disclosure, the first synthesized image SYN1 may overlap a predetermined area of the background image BIMG. The background image BIMG and the synthesized image SYN1 overlapping the background image BIMG are illustrated as an intermediate image ITM in FIG. 11. The second convolutional neural network 720 is configured to synthesize the background image BIMG and the first synthesized image SYN1 overlapping the background image BIMG according to image harmonization and output the second synthesized image SYN2. Accordingly, the first synthesized image SYN1 is converted to reflect features of the background image BIMG, such as tone, style, saturation, and contrast, and overlaps the background image BIMG in the second synthesized image SYN2. The second synthesized image SYN2 may be provided as a virtual try-on image VTIMG.

The second convolutional neural network 720 may be configured similarly to the convolutional neural network 610 of FIG. 9 except for input and output data. In this embodiment, the background image BIMG and the first synthesized image SYN1 may be provided as the reference image RIMG and target image TIMG of FIG. 9, respectively, and the converted image SIMG of FIG. 9 may be provided as the second synthesized image SYN2.

Afterwards, the image provider 310 of FIG. 3 may display the virtual try-on image VTIMG through the display device 120. For example, the image provider 310 may visualize the virtual try-on image VTIMG through the display device 120 instead of the background image BIMG of FIG. 10.

As described above, the virtual try-on image generating part 700 may, by primarily performing image harmonization on the user object UOBJ and the clothes object COBJ and secondarily performing image harmonization on the corresponding synthesized image and the background image BIMG, generate a high-quality virtual try-on image VTIMG including a clothes object COBJ that fits not only the features of the user object UOBJ but also the background image BIMG. When a system for providing screen sports such as screen golf employs the virtual try-on image generating part 700, it is possible for the user to check whether the corresponding clothes suit the user or not as well as the actual golf course, and accordingly, a desire to purchase can be stimulated.

Figure 12:
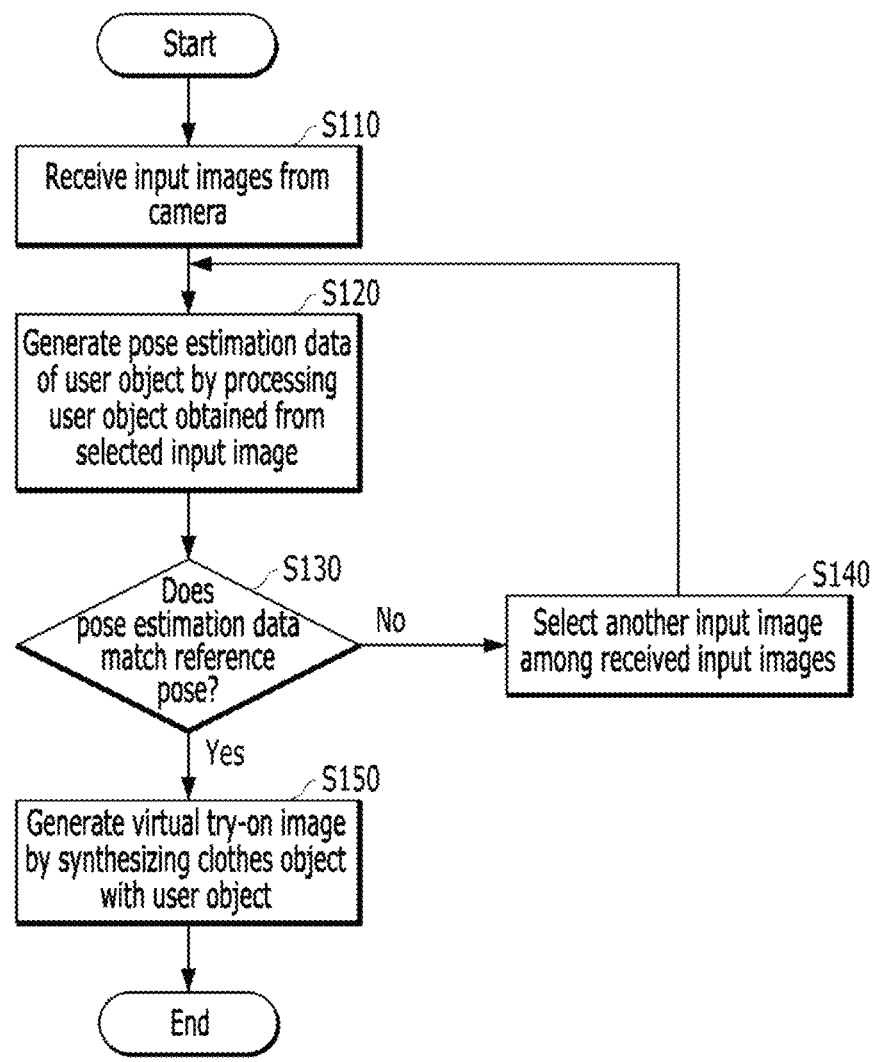
FIG. 12 is a flowchart for illustrating a method for providing a virtual try-on image in accordance with an embodiment of the present disclosure.

FIG. 12 is a flowchart for illustrating a method for providing a virtual try-on image in accordance with an embodiment of the present disclosure. The virtual try-on image providing method of FIG. 12 may be performed by the image providing device 300 of FIG. 3.

Referring to FIG. 12, in operation S110, input images are received from a camera (e.g. the camera 130 in FIG. 3).

In operation S120, one of the input images is selected, and a user object obtained from the selected input image is processed to generate pose estimation data representing a pose of the user object.

In certain embodiments of the present disclosure, coordinates and/or vectors of user keypoints may be detected from the user object, and the detected user keypoints may be provided as pose estimation data. In some embodiments of the present disclosure, user keypoints may be estimated from a user object by using a neural network trained to detect user keypoints from a human object based on deep learning.

In operation S130, it is determined whether the pose estimation data generated in operation S120 matches a reference pose. To this end, reference pose data corresponding to the reference pose is provided, and pose estimation data may be compared with the reference pose data. Reference pose data may include coordinates and/or vectors of reference keypoints corresponding to the reference pose.

In some embodiments of the present disclosure, when an average of distances between a user keypoint and a reference keypoint is less than or equal to a threshold value, it may be determined that the pose estimation data matches the reference pose. In certain embodiments of the present disclosure, whether the user keypoints match the reference keypoints may be determined by using a neural network trained to determine whether the keypoints of the first group and the keypoints of the second group match each other. When the pose estimation data does not match the reference pose, operation S140 is performed. However, when the pose estimation data matches the reference pose, operation S150 is performed.

In operation S140, another input image is selected from among the received input images. Thereafter, operations S120 and S130 are performed on the selected another input image again.

In operation S150, a clothes object is synthesized with a user object to generate a virtual try-on image, and the generated virtual try-on image is displayed or output.

Considering that, in screen sports, users can take various poses according to their movements, a high-quality virtual try-on image may be provided by determining whether a user's pose represented by the pose estimation data matches a reference pose and synthesizing the clothes object with the corresponding user object according to the determination result. For example, the virtual try-on image may embody a natural trying-on of clothes.

Figure 13:
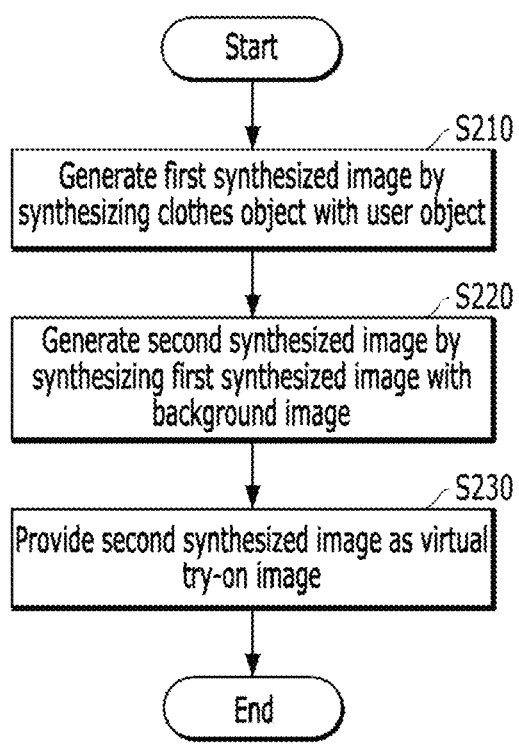
FIG. 13 is a flowchart for illustrating operation S150 of FIG. 12 according to an embodiment of the present disclosure.

FIG. 13 is a flowchart for illustrating operation S150 of FIG. 12 according to an embodiment of the present disclosure.

Referring to FIG. 13 together with FIG. 11, in operation S210, the clothes object COBJ is synthesized with the user object UOBJ to create a first synthesized image SYN1. In some embodiments of the present disclosure, a first convolutional neural network (e.g. the first convolutional neural network 710 in FIG. 10) trained to synthesize an arbitrary clothes object with a human object is provided, and the user object UOBJ and the clothes object COBJ overlapping the user object UOBJ may be input to the first convolutional neural network to generate the first synthesized image SYN.

In operation S220, the first synthesized image SYN1 overlaps the background image BIMG (see ITM in FIG. 11), and the background image BIMG and the first synthesized image SYN1 overlapping the background image BIMG are synthesized to generate a second synthesized image SYN2. In certain embodiments of the present disclosure, a second convolutional neural network (e.g. the second convolutional neural network 720 in FIG. 10) trained to synthesize an arbitrary object with a background image is provided, and the background image BIMG and the first synthesized image SYN1 overlapping the background image BIMG may be input to the second convolutional neural network to generate the second synthesized image SYN2.

In operation S230, the second synthesized image SYN2 is provided as a virtual try-on image.

As described above, by primarily performing image harmonization on the user object UOBJ and the clothes object COBJ, and secondarily performing image harmonization on the corresponding synthesized image and the background image BIMG, a high-quality virtual try-on image VTIMG including a clothes object COBJ that fits not only the features of the user object UOBJ but also the background image BIMG may be generated.

Figure 14:
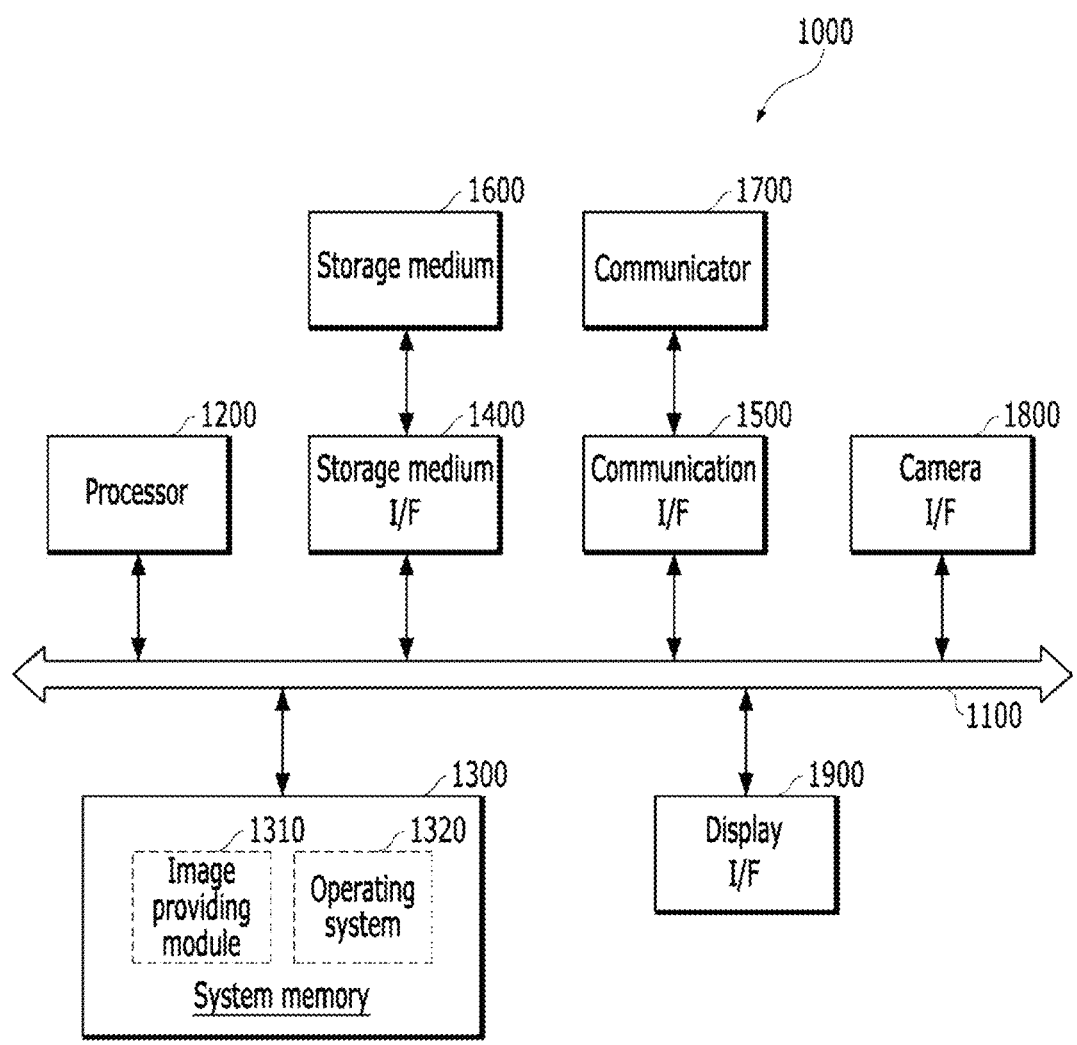
FIG. 14 is a block diagram for illustrating a computer device for implementing an image providing device of FIG. 3 according to an embodiment of the present disclosure.

FIG. 14 is a block diagram for illustrating a computer device for implementing the image providing device of FIG. 3 according to an embodiment of the present disclosure.

Referring to FIG. 14, a computer device 1000 may include one or more a bus 1100, at least one processor 1200, a system memory 1300, a storage medium interface 1400, a communication interface 1500, a storage medium 1600, a communicator 1700, a camera interface 1800, and a display interface 1900.

The bus 1100 is connected to various components of the computer device 1000 to transfer or receive data, signals, and information. The processor 1200 may be either a general purpose or a special purpose or dedicated processor, and may control overall operations of the computer device 1000.

The processor 1200 is configured to load program codes and instructions providing various functions into the system memory 1300 when executed, and to process the loaded program codes and instructions. The system memory 1300 may be provided as a working memory and/or a buffer memory of the processor 1200. As an example, the system memory 1300 may include at least one of a random access memory (RAM), a read only memory (ROM), and other types of computer-readable media.

The processor 1200 may load the image providing module 1310, which may provide functions of the image provider 310 of FIG. 3, into the system memory 1300 when executed by the processor 1200. Such program codes and/or instructions may be executed by the processor 1200 to perform the functions and/or operations of the image provider 310 described with reference to FIG. 3. Program codes and/or instructions may be loaded into the system memory 1300 from a storage medium 1600, which is a recording medium readable by a separate computer. Alternatively, program codes and/or instructions may be loaded into the system memory 1300 from the outside of the computer device 1000 (e.g. an external device) through the communicator 1700.

In addition, the processor 1200 may load the operating system 1320 for providing an environment suitable for the execution of the image providing module 1310 into the system memory 1300 when executed by the processor 1200, and execute the loaded operating system 1320. For the image providing module 1310 to use components such as the storage medium interface 1400, the communication interface 1500, the camera interface 1800, and the display interface 1900 of the computer device 1000, the operating system 1320 may interface between them and the image providing module 1310. In exemplary embodiments of the present disclosure, at least some functions of the storage medium interface 1400, the communication interface 1500, the camera interface 1800, and the display interface 1900 may be performed by the operating system 1320.

In FIG. 14, the system memory 1300 is shown as a separate element or configuration from the processor 1200, but at least a portion of the system memory 1300 may be included in the processor 1200. The system memory 1300 may be provided as a plurality of memories physically and/or logically separated from each other according to embodiments.

The storage medium interface 1400 is connected to the storage medium 1600. The storage medium interface 1400 may interface between components such as the processor 1200 and the system memory 1300 connected to the bus 1100 and the storage medium 1600. The communication interface 1500 is connected to the communicator 1700. The communication interface 1500 may interface between the components connected to the bus 1100 and the communicator 1700. The storage medium interface 1400 and the communication interface 1500 may be provided as the storage medium interface 350 and the communication interface 340 of FIG. 3, respectively.

The storage medium 1600 may include various types of non-volatile storage media, such as a flash memory and a hard disk, which retain stored data even when power is cut off. The storage medium 1600 may be provided as at least part of the storage medium 355 of FIG. 3.

The communicator 1700 (e.g. a transceiver) may be configured to transmit and receive signals between the computer device 1000 and servers (e.g. the server 20 in FIG. 1) on a network. The communicator 1700 may be provided as the communicator 345 of FIG. 3.

The camera interface 1800 may interface between components such as the processor 1200 and the system memory 1300 connected to the bus 1100 and an external camera such as a camera outside of the computer device 1000. The camera interface 1800 may be provided as the camera interface 330 of FIG. 3.

The display interface 1900 may interface between components such as processor 1200 and system memory 1300 connected to bus 1100 and external display devices such as display devices outside the computer device 1000. The display interface 1900 may be provided as the display interface 320 of FIG. 3.

According to an embodiment of the present disclosure, a device for visualizing a virtual try-on image can express a natural appearance of wearing clothes and a system including the same. And, a device and method for providing a virtual try-on image according to some embodiments of the present disclosure can achieve increased flexibility, faster processing times, and smaller computing resources for generating the virtual try-on images.

Although specific embodiments and application examples have been described herein, this is merely provided to help a more general understanding of the present disclosure, and the present disclosure is not limited to the above embodiments, and various modifications and variations are possible from this description to those skilled in the art to which the present disclosure pertains.

Therefore, the idea of the present disclosure should not be limited to the described embodiments, and it should be understood that not only the claims to be described later, but also all equivalents or equivalent modifications of these claims belong to the scope of the present disclosure.

What is claimed is:

1. A computer device for providing a virtual try-on image, the computer device comprising:
   a camera interface connected to a camera;
   a display interface connected to a display device;
   a storage medium; and
   a processor configured to:
   communicate with the camera and the display device through the camera interface and the display interface, respectively;
   receive input images, including a user object and generated by the camera, through the camera interface;
   generate pose estimation data representing a pose of the user object included in one of the received input images, wherein the pose estimation data comprises first keypoints representing body parts of the user object;
   select, among the received input images, an input image having the user object of which pose represented by the pose estimation data matches a reference pose, wherein the storage medium is configured to store second keypoints corresponding to the reference pose;
   determine whether the pose estimation data matches the reference pose by determining whether the first keypoints of the pose estimation data match the second keypoints corresponding to the reference pose;
   generate the virtual try-on image by synthesizing a clothes object with the user object included in the selected input image; and
   control the display device through the display interface to output the virtual try-on image through the display interface.

2. The computer device of claim 1, wherein a neural network is trained to determine whether keypoints of a first pose and keypoints of a second pose match each other by inputting the keypoints of the first pose and the keypoints of the second pose to the neural network, and wherein the processor is configured to determine whether the first keypoints of the pose estimation data match the second keypoints corresponding to the reference pose based on data which is output from the neural network by inputting the first keypoints of the pose estimation data and the second keypoints corresponding to the reference pose to the neural network.

3. The computer device of claim 1, wherein the processor is configured to generate the virtual try-on image by performing image harmonization on the user object included in the selected input image and the clothes object overlapping the user object included in the selected input image.

4. The computer device of claim 1, wherein the processor is configured to:
   generate a first synthesized image by synthesizing the clothes object with the user object included in the selected input image; and
   generate a second synthesized image to be the virtual try-on image by synthesizing the first synthesized image with a background image which is to be overlapped with the first synthesized image.

5. The computer device of claim 4, wherein:
   the first synthesized image is generated by performing image harmonization on the user object included in the selected input image and the clothes object overlapping the user object included in the selected input image, and
   the second synthesized image is generated by performing the image harmonization on the background image and the first synthesized image overlapping the background image.

6. The computer device of claim 1, further comprising a communicator connected to a network,
   wherein the processor is configured to receive the clothes object from a client server through the communicator.

7. A computerized method for providing a virtual try-on image, the computerized method comprising:
   generating input images including a user object by photographing a user using a camera;
   generating pose estimation data representing a pose of the user object included in one of the generated input images, wherein the pose estimation data comprises first keypoints representing body parts of the user object;
   selecting, among the generated input images, an input image having the user object of which pose represented by the pose estimation data matches a reference pose;
   determining whether the pose estimation data matches the reference pose by determining whether the first keypoints of the pose estimation data match second keypoints corresponding to the reference pose;
   generating the virtual try-on image by synthesizing a clothes object with the user object included in the selected input image; and
   outputting the virtual try-on image using a display device.

8. The computerized method of claim 7, wherein the generating of the virtual try-on image comprises:
   generating a first synthesized image by synthesizing the clothes object with the user object included in the selected input image; and
   generating a second synthesized image to be the virtual try-on image by synthesizing the first synthesized image with a background image which is to be overlapped with the first synthesized image.

9. A computer device for providing user experience by visualizing background images, the computer device comprising:
   a camera interface connected to a camera;

a display interface connected to a display device;
a storage medium; and
a processor configured to:
communicate with the camera and the display device through the camera interface and the display interface, respectively;
receive input images, generated by the camera photographing a user, through the camera interface;
generate pose estimation data associated with an user object obtained from one of the input images, wherein the pose estimation data comprises first keypoints representing body parts of the user object;
select, among the received input images, an input image having the user object of which pose represented by the pose estimation data matches a reference pose, wherein the storage medium is configured to store second keypoints corresponding to the reference pose;
determine the one of the input images, from which the user object is obtained, as the selected input image when a pose of the user object associated with the pose estimation data matches a reference pose;
generate a first synthesized image by performing first image harmonization on the user object included in the input image selected among the input images and a clothes object overlapping the user object;
generate a second synthesized image by performing second image harmonization on one background image among the background images and the first synthesized image overlapping the one background image; and
output the second synthesized image by controlling the display device through the display interface.

10. The computer device of claim 9, wherein the processor is configured to convert the clothes object in association with the user object by processing the user object and the clothes object through a first convolutional neural network trained to perform the first image harmonization,
wherein the first convolutional neural network comprises at least one first convolutional encoder layer and at least one first convolutional decoder layer, and
wherein the first synthesized image comprises at least a part of the user object and the converted clothes object overlapping the user object.

11. The computer device of claim 10, wherein the processor is configured to convert the first synthesized image in association with the background image by processing the background image and the first synthesized image through a second convolutional neural network trained to perform the second image harmonization,
wherein the second convolutional neural network comprises at least one second convolutional encoder layer and at least one second convolutional decoder layer, and
wherein the second synthesized image comprises at least a part of the background image and the converted first synthesized image overlapping the background image.

* * * * *